United States Patent

[11] 3,604,573

| [72] | Inventor | John Daniel Leitch |
| | | Toronto, Ontario, Canada |
| [21] | Appl. No. | 839,247 |
| [22] | Filed | July 7, 1969 |
| [45] | Patented | Sept. 14, 1971 |
| [73] | Assignee | Upper Lakes Shipping Ltd. |

[54] SYSTEM AND APPARATUS FOR UNLOADING BULK MATERIAL FROM A STORAGE ENCLOSURE
4 Claims, 3 Drawing Figs.

| [52] | U.S. Cl. | 214/15 C |
| [51] | Int. Cl. | B63b 27/12 |
| [50] | Field of Search | 214/15, 15 D, 15 E, 16, 17.82, 17.8 H, 14.15 C |

[56] References Cited
UNITED STATES PATENTS

| 1,584,442 | 5/1926 | Every | 214/15 E |
| 1,808,862 | 6/1931 | Peterson | 214/15 C |
| 2,893,574 | 7/1959 | Bartenfeld | 214/15 C |
| 3,149,733 | 9/1964 | Joyce | 214/15 |
| 3,179,264 | 4/1965 | Tallquist | 214/17.8 |
| 3,414,144 | 12/1968 | Lassing | 214/15 |

FOREIGN PATENTS

| 738,822 | 7/1966 | Canada | 214/15 |

*Primary Examiner*—Gerald M. Forlenza
*Assistant Examiner*—Frank E. Werner
*Attorney*—Douglas S. Johnson

ABSTRACT: A system for unloading a bulk carrier has a flat-bottomed hold with a series of gates thereon to gravity-feed material on to a longitudinal conveyor positioned below the flat bottom; the unloading of the remaining material unaffected by gravity is completed by a deck-supported sling which moves across and along the hold.

INVENTOR.
JOHN D. LEITCH
BY Douglas S. Johnson

SYSTEM AND APPARATUS FOR UNLOADING BULK MATERIAL FROM A STORAGE ENCLOSURE

FIELD OF THE INVENTION

This invention relates to a system and apparatus for unloading bulk material from a storage enclosure and has particular relation to the apparatus for unloading the hold of a cargo vessel containing any type of bulk cargo, such as coal, grain, raw iron ore, etc.

DESCRIPTION OF THE PRIOR ART

In U.S. Pat. No. 3,384,248 there is described a system and apparatus for unloading bulk material from a cargo vessel wherein the hold containing the material has a centrally located lengthwise discharge conveyor under the hold, the material being fed progressively through a series of gates in the hold surface disposed above the conveyor; the floor of the hold is inclined downwards on each side of the conveyor. After gravity unloading has effected the removal of all possible material, the reclaimer apparatus, which travels on rails, is then advanced into the hold with the object of dislodging and discharging the material which adheres to the side of the hole.

The system and apparatus described in the above-mentioned U.S. Pat. No. 3,384,248 are only applicable to a cargo vessel having a single hold and have particular application to large vessels designed to operate on inland waters, the hold of such vessel extending substantially the whole length thereof. However, in order to meet oceangoing requirements the hold of a cargo vessel is usually divided into a series of watertight compartments, and in such a vessel it would not be possible to operate the reclaimer apparatus disclosed in U.S. Pat. No. 3,384,248.

It is an object of the invention to provide a system and apparatus for rapid unloading of bulk material from the hold of a cargo vessel irrespective of the number of compartments.

It is a further object of the invention to provide a system and apparatus for rapid unloading of bulk material from the hold of a cargo vessel having a plurality of separate watertight compartments, which cargo vessel meets oceangoing requirements.

BRIEF DESCRIPTION OF THE DRAWINGS

The invention will now be described in relation to the accompanying drawings in which.

DESCRIPTION OF THE PREFERRED EMBODIMENTS

Figure 1:
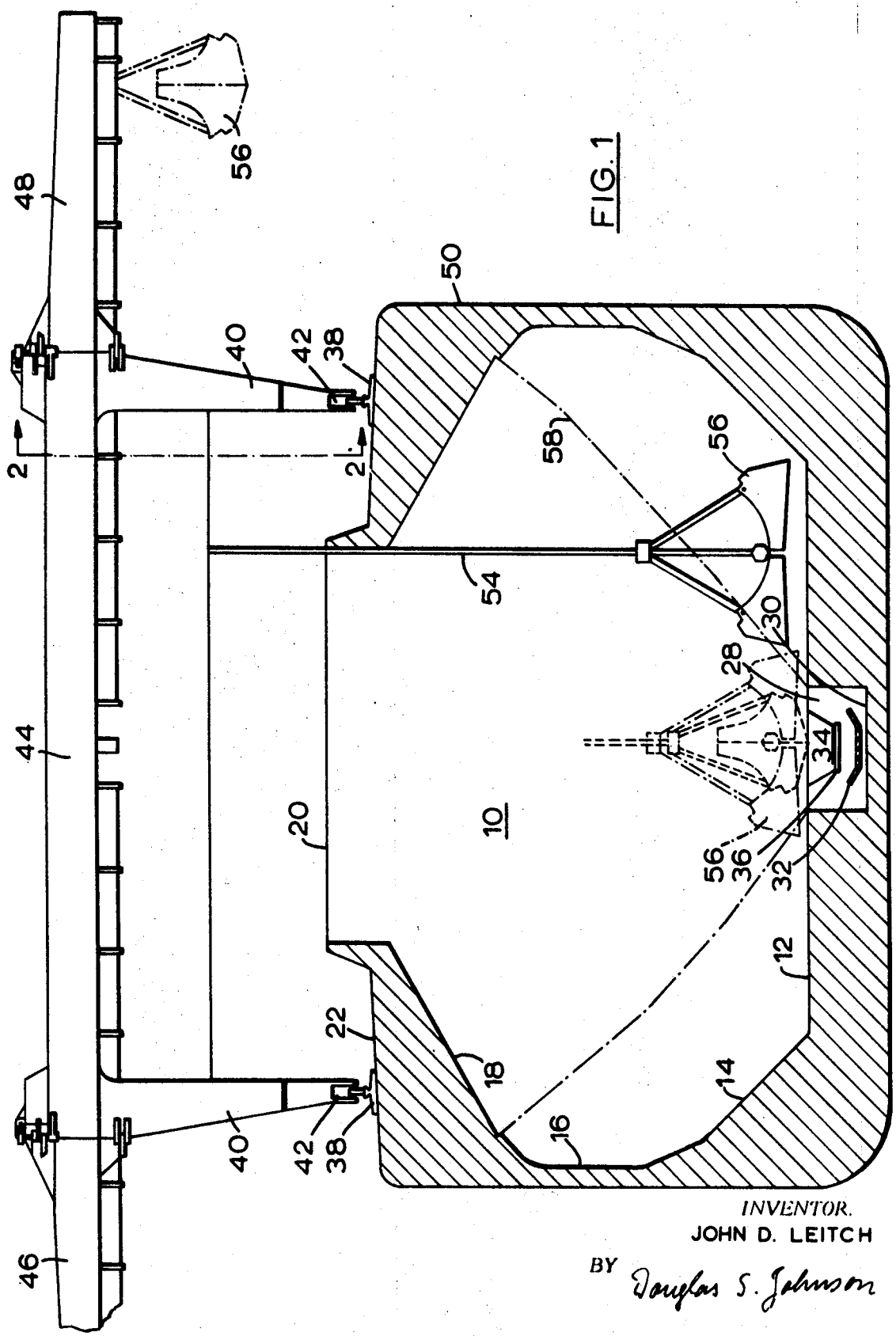
FIG. 1 is a cross section through an oceangoing cargo vessel illustrating a longitudinal transporting conveyor and dislodging equipment constructed according to the invention.
Figure 2:
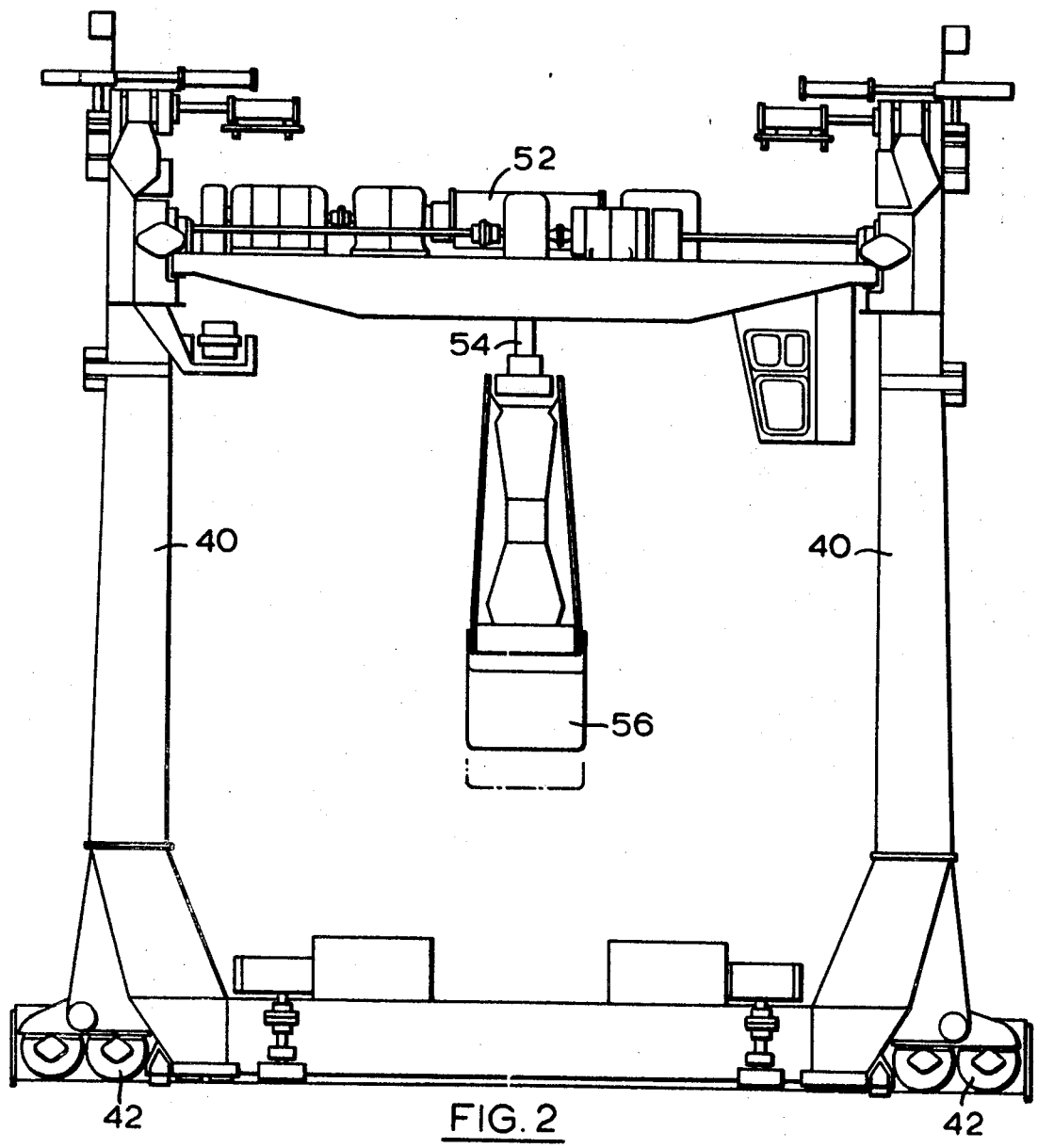
FIG. 2 is a cross section taken on the lines 2—2 of FIG. 1.

Referring now to the drawings, the hold 10 of the cargo vessel is defined along its lower surface by a floor 12 which substantially covers the hold 10 as a horizontal platform; this provides extra cubic area over previous hoppered bottom self-unloaders. A short sloping sidewall portion 14 extends upwards from the hold 10, the sidewall portion 14 blending into a vertically disposed portion 16, which in turn merges into an overhanging portion 18 terminating in an opening 20 in the deck 22.

Figure 3:
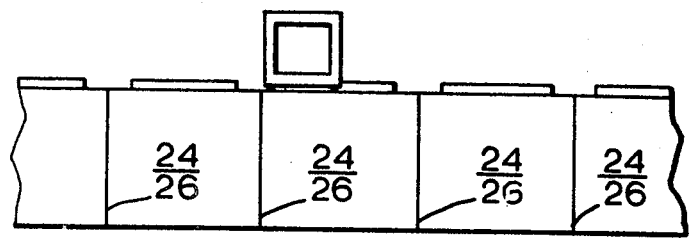
FIG. 3 is a schematic illustration of the preferred arrangement of the compartments of an oceangoing cargo vessel.

The hold 10 is divided into a series of separate watertight compartments 24, see FIG. 3, by watertight cross walls 26, the construction of such compartments 24 being the usual arrangement to enable the vessel to meet oceangoing requirements; however it will be appreciated that the system described hereunder is also applicable to a hold having no cross walls 26.

The floor 12 which supports the bulk material within the hold 10 is arranged to define a channel 28 positioned generally centrally of the vessel and extending longitudinally from one end of the hold 10 to the other, i.e., the channel 28 is common to all compartments 24.

The base 30 of the channel 28 constitutes the lowest point of the hold 10 so that the bulk material flows by gravity into the channel 28. A conveyor 32 is supported adjacent the base 30 on the channel 28 and is adapted to transport material lengthwise of the hold 10 to an apparatus (not shown) positioned at the forward end of the vessel which raises it to deck level for eventual delivery ashore.

Bulk material flows into the channel 28 and on to the conveyor 32 through chutes 34 which extend downwardly into the channel 28 from the level of the floor 12 in vertically spaced relation to the conveyor 32. Each chute 34 is provided with a gate 36 at its lower end which controls the flow of material on to the conveyor 32.

After gravity unloading has effected the removal of all possible material from the hold 10, quantities of additional material will generally remain packed in piles along the areas flanking the channel 28. In order to disturb this material and propel it through the chutes 34 on to the conveyor 32, means travelling along and across the deck 22 of the cargo vessel are employed. For this purpose there are disposed on each side of the openings 20 and running along the entire length of the deck 22, a pair of rails 38, each carrying an upright member 40 supported on spaced-apart wheels 42 located on the individual rails 38.

The members 40 are joined by a member 44 which is disposed above and across the deck 22. The crossmember 44 acts as a gantry and is provided with opposed hinged ends 46 and 48 which may be extended outwards over the side of the hull 50 of the cargo vessel. The cross member 44 carries drive means, generally denoted by the numeral 52, to which is attached through suitable gearing (not shown) a sling 54 which can be lowered into the hold 10.

A grab bucket 56 is supported at the free end of the sling 54; the primary purpose of the grab bucket 56 and the sling 54 is to disturb the bulk material which remains packed in piles along the areas flanking the channel 28 and urge this material towards the conveyor 32.

The surface of the bulk material in the hold 10 will generally assume the angle shown by the broken line 58 after gravity feed into the channel 28 and then on to conveyor 32 has been completed, though it will be appreciated that the actual inclination of the broken line 58 will depend on the nature of the bulk material.

To complete the discharge of this piled bulk material the sling 54 is lowered into the hold 10. Oscillatory movement of the grab bucket 56 through movement of the upper end of the sling 54 on the cross member 44 will cause initial dislodgement of the bulk material and eventually it will be dislodged not only from contact with the vertically disposed portion 16 of the hold 10 but also the sloping sidewall portion 14. When this is accomplished, the bulk material will simply lie on the floor 12 of the hold 10, at which time the grab bucket 56 serves a secondary purpose through repeated closure to transfer the material to a position above the channel 28, after which it is released downwards into the conveyor 32.

As a result of the provision of the conveyor 32 which extends substantially the whole length of the hole 10 and beneath all the compartments 24, the vessel can be rapidly unloaded by gravity feed which is then completed, also rapidly, by operation of the sling 54 and the grab bucket 56. The provision of a flat bottom 12 facilitates the operation of the grab bucket 56 and, as mentioned previously, the flat bottom provides extra cubic capacity as compared with previous constructions of self-unloaders.

I claim:

1. A system for unloading bulk material from a hole of a vessel, which system comprises means defining a channel extending longitudinally of the hold generally centrally thereof, a conveyor in said channel, individual means defining openings in said hold through which material can flow downwardly due to the effect of gravity on to said conveyor, and grab bucket means supported above said hold, said means being movable above said hold along the length and across said hold to an extent greater than the width thereof, and downwards therein; said grab bucket means being supported by sling means so that, on being lowered into said hold said grab means is movable therein, lengthwise and crosswise, so as to disturb the material piled in said hold which is unaffected by gravity by oscillatory motion of said grab bucket against said material, and by closure of the grab bucket so as to lift material therein clear of the hold.

2. A system according to claim 1, wherein said hold has a flat bottom above said channel.

3. A system according to claim 1, wherein said grab bucket movable means further transfers said dislodged material onto said conveyor.

4. A system according to claim 1, wherein said hold has a plurality of individual compartments defined substantially by the sides of the vessel, and spaced-apart cross walls, said grab bucket means on lowering being movable into a selected one of said compartments.